United States Patent [19]

Rollmann

[11] 4,107,195
[45] Aug. 15, 1978

[54] PREPARATION OF ZEOLITE ZSM-35

[75] Inventor: Louis Deane Rollmann, Princeton, N.J.

[73] Assignee: Mobil Oil Corporation, New York, N.Y.

[21] Appl. No.: 789,900

[22] Filed: Apr. 22, 1977

[51] Int. Cl.$^2$ .......................... C07F 5/06; C01B 33/28
[52] U.S. Cl. ........................... 260/448 C; 252/431 N; 252/455 Z; 423/328; 423/329
[58] Field of Search ............... 423/328, 329, 330, 118; 260/448 C; 252/455 Z, 431 N

[56] References Cited

U.S. PATENT DOCUMENTS

| | | | |
|---|---|---|---|
| 3,306,922 | 2/1967 | Barrer et al. | 260/448 C |
| 3,992,466 | 11/1976 | Plank et al. | 260/671 C |
| 4,016,245 | 4/1977 | Plank et al. | 423/328 |

OTHER PUBLICATIONS

Breck, "Zeolite Molecular Sieves" 1974, pp. 304–312.

Primary Examiner—Edward J. Meros
Attorney, Agent, or Firm—Charles A. Huggett; Raymond W. Barclay; Dennis P. Santini

[57] ABSTRACT

A new and useful improvement in the method for preparing synthetic crystalline aluminosilicate zeolite ZSM-35 is provided. The improved method comprises synthesizing zeolite ZSM-35 in the presence of butanediamine as template rather than the conventional template of ethylenediamine or pyrrolidine. Not only is synthesis of zeolite ZSM-35 facilitated by the present improved method, but the zeolite product is substantially more pure than that obtained by the conventional method of synthesis. Further, catalysts made with the zeolite ZSM-35 synthesized in accordance hereto are much more catalytically active than those obtained by the conventional synthesis method.

19 Claims, No Drawings

PREPARATION OF ZEOLITE ZSM-35

BACKGROUND OF THE INVENTION

1. Field of the Invention

This invention relates to a new and improved form of zeolite ZSM-35, to a new and useful improvement in synthesizing zeolite ZSM-35 and to use of the zeolite ZSM-35 prepared in accordance hereto as a catalyst for organic compound, e.g. hydrocarbon compound, conversion.

More particularly, this invention relates to an improved method of preparing zeolite ZSM-35 whereby synthesis is facilitated and the zeolite product exhibits enhanced purity and catalytic activity when compared to conventionally synthesized zeolite ZSM-35.

2. Discussion of Prior Art

Zeolite ZSM-35 and its conventional preparation are taught by U.S. Pat. No. 4,016,245, the disclosure of which is incorporated herein by reference. It has a distinctive X-ray diffraction pattern which identifies it from other known zeolites.

Applicant knows of no prior art methods for preparing zeolite ZSM-35 utilizing the present improved method.

SUMMARY OF THE INVENTION

An improved method for preparing an improved crystalline aluminosilicate zeolite ZSM-35 exhibiting enhanced purity, catalytic activity and aging properties is provided which comprises forming a reaction mixture containing sources of an alkali metal oxide, an organic nitrogen-containing oxide, an oxide of aluminum, an oxide of silicon and water and having a composition, in terms of mole ratios of oxides, falling within the following ranges:

| | | |
|---|---|---|
| $SiO_2/Al_2O_3$ | = | 8.8–200 |
| $H_2O/SiO_2$ | = | 5–100 |
| $OH^-/SiO_2$ | = | $10^{-10}$–1.0 |
| $M/SiO_2$ | = | 0.1–3.0 |
| $R/SiO_2$ | = | 0.05–2.0 | wherein R is butanediamine and M is an alkali metal ion, and maintaining the mixture until crystals of the zeolite are formed. The quantity of $OH^-$ is calculated only from the inorganic sources of alkali without any organic base contribution. Thereafter, the crystals are separated from the liquid and recovered. Reaction conditions required consist of heating the foregoing reaction mixture to a temperature of from about 90° F to about 400° F for a period of time of from about 3 hours to about 100 days. A more preferred temperature range is from about 150° F to about 400° F with the amount of time at a temperature in such range being from about 6 hours to about 80 days.

The digestion of the gel particles is carried out until crystals form. The solid product is separated from the reaction medium, as by cooling the whole to room temperature, filtering and water washing.

It is recalled that in calculating the mole ratio of hydroxide ions/silica, it is conventional to calculate hydroxide by summing moles of $OH^-$, whether added as NaOH, as sodium silicate (NaOH + $SiO_2$), as sodium aluminate (NaOH + $Al_2O_3$), or the like, and to subtract from the sum any moles of acid added. Acid may be added simply as HCl, $HNO_3$, $H_2SO_4$, acetic acid, and the like or it may be added as an aluminum sulfate ($Al_2O_3$ + $H_2SO_4$), chloride ($Al_2O_3$ + HCl), nitrate ($Al_2O_3$ + $HNO_3$), etc. Each mole of $Al_2O_3$ is itself equivalent to 2 moles of acid in this calculation, since $Al_2O_3$ consumes 2 moles of hydroxide in its conversion to framework aluminate ion.

In particular, no contribution is assigned to organic bases such as amines in this calculation. Amines present in reaction mixtures having an $OH^-/SiO_2$ ratio of 0.01 are protonated when further acid is added. Until said additional acid exceeds the amine present, the pH remains above 7.

In a conventional calculation which does not consider amines, the total moles of acid could thereby exceed the moles of hydroxide initially present in said reaction mixture and subtraction would thereby lead to apparent "negative" $OH^-/SiO_2$ ratios. A negative ratio is, of course, not possible since the true moles of hydroxide (per liter) in an aqueous mixture are always positive and equal to $10^{-14}$ divided by the moles per liter of acid. Calculated from the true moles of hydroxide, the present invention would include an $OH^-/SiO_2$ range of about $10^{-10}$ to about 1.0.

For convenience, and to maintain the conventions established in describing reaction mixture compositions, we define a ratio of $H^+$(additional)/$SiO_2$, which is equal to the moles of $H^+$ added in excess of the moles $OH^-$ added in preparing the reaction mixture.

When the present improved method of preparing ZSM-35 is followed, an increase in the rate of crystallization at a given reaction temperature is achieved when compared to the conventional prior art method of manufacture; reduced amounts of nitrogen-containing organic compound are required; and products of higher crystalline purity often result. Each of these factors leads to reduced cost in the synthesis of effective ZSM-35 catalyst material. The time required for crystallization may in some cases be reduced by a factor of 5–10; costly organics requirements may be reduced by a factor of 2–4.

The particular effectiveness of a butanediamine, especially 1,4-butanediamine when compared with other diamines such as ethylenediamine, propanediamine or pentanediamine, is believed due to its ability to function as a template in the nucleation and growth of ZSM-35 crystals.

It is interesting to note that the crystals of ZSM-35 prepared in accordance hereto exhibit a plate-like morphology previously unreported for ZSM-35 prepared in the conventional manner. The conventionally prepared ZSM-35 tends to exhibit lath-shaped crystals whose pore channels parallel the long dimension. Morphology changes, by their influence on diffusion dimensions in a zeolite can significantly enhance catalytic activity and aging characteristics.

The composition for the synthesis of synthetic ZSM-35 can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing ZSM-35 can be supplied by one or more essential reactants and they can be mixed together in any order. For example, any oxide can be supplied by an aqueous solution, sodium hydroxide or by an aqueous solution of a suitable silicate; the organic nitrogen-containing cation can be supplied by a compound of that cation, such as, for example, the hydroxide or a salt, as well as by the indicated amine. The reaction mixture can be prepared either batchwise or continuously. Crystal size and crystallization time of the ZSM-35 composition will vary with the nature of the reaction mixture employed.

The ZSM-35 composition as prepared hereby has a characteristic X-ray diffraction pattern, the values of which are set forth in Table 1, hereinafter. The ZSM-35 composition as prepared hereby can also be identified, in terms of mole ratios of oxides and in the anhydrous state, as follows:

$(0.3-5)R : (0-0.8)M_2O : Al_2O_3 : xSiO_2$ wherein R is butanediamine or an organic nitrogen-containing cation derived therefrom, M is an alkali metal cation and $x$ is greater than 8, and is characterized by a specified X-ray powder diffraction pattern. It will be noticed that the ratio of R to $Al_2O_3$ may exceed unity in this material due to the occlusion of excess organic species (R) within the zeolite pores.

ZSM-35 as hereby prepared can further be characterized by its sorptive capacity at 90° C, as will be hereinafter established.

In a preferred synthesized form, the zeolite hereby prepared has a formula, in terms of mole ratios of oxides and in the anhydrous state, as follows:

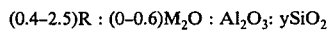

$(0.4-2.5)R : (0-0.6)M_2O : Al_2O_3 : ySiO_2$ wherein R is butanediamine or an organic nitrogen-containing cation derived therefrom, M is an alkali metal, especially sodium and $y$ is from greater than 8 to about 50.

The original alkali metal cations of the as synthesized ZSM-35 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIB IVB, VIB, VIII, IB, IIB, IIIA IVA.

The synthetic ZSM-35 zeolite prepared in accordance hereto possesses a definite distinguishing crystalline structure whose X-ray diffraction pattern shows substantially the significant lines set forth in Table 1.

TABLE 1

| d(A) | I/Io |
|---|---|
| 9.6 ± 0.20 | Very Strong-Very Very Strong |
| 7.10 ± 0.15 | Medium |
| 6.98 ± 0.14 | Medium |
| 6.64 ± 0.14 | Medium |
| 5.78 ± 0.12 | Weak |
| 5.68 ± 0.12 | Weak |
| 4.97 ± 0.10 | Weak |
| 4.58 ± 0.09 | Weak |
| 3.99 ± 0.08 | Strong |
| 3.94 ± 0.08 | Medium-Strong |
| 3.85 ± 0.08 | Medium |
| 3.78 ± 0.08 | Strong |
| 3.74 ± 0.08 | Weak |
| 3.66 ± 0.07 | Medium |
| 3.54 ± 0.07 | Very Strong |
| 3.48 ± 0.07 | Very Strong |
| 3.39 ± 0.07 | Weak |
| 3.32 ± 0.07 | Weak-Medium |
| 3.14 ± 0.06 | Weak-Medium |
| 2.90 ± 0.06 | Weak |
| 2.85 ± 0.06 | Weak |
| 2.71 ± 0.05 | Weak |
| 2.65 ± 0.05 | Weak |
| 2.62 ± 0.05 | Weak |
| 2.58 ± 0.05 | Weak |
| 2.54 ± 0.05 | Weak |

TABLE 1-continued

| d(A) | I/Io |
|---|---|
| 2.48 ± 0.05 | Weak |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/Io, where Io is the intensity of the strongest line or peak, and d (obs.), the interplanar spacing in Angstrom units, corresponding to the recorded lines, were calculated. It should be understood that this X-ray diffraction pattern is characteristic of all the species of ZSM-35 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has previously been subjected to thermal treatment.

A further characteristic of ZSM-35 is its sorptive capacity proving said zeolite to have increased capacity for 2-methylpentane (with respect to n-hexane sorption by the ratio n-hexane/2-methylpentane) when compared with a hydrogen form of natural ferrierite resulting from calcination of an ammonium exchanged form. The characteristic sorption ratio n-hexane/2-methylpentane for ZSM-35 (after calcination at 600° C) is less than 10, whereas that ratio for the natural ferrierite is substantially greater than 10, for example, as high as 34 or higher.

While the improved zeolite ZSM-35 may be used in a wide variety of organic compound, e.g. hydrocarbon compound, conversion reactions, it is notably useful in the processes of polymerization, aromatization and cracking. Other conversion processes for which improved ZSM-35 may be utilized in one or more of its active forms include, for example, hydrocracking and converting light aliphatics to aromatics such as in U.S. Pat. No. 3,760,024.

Synthetic ZSM-35 zeolites prepared in accordance hereto can be used either in the organic nitrogen-containing and alkali metal containing form, the alkali metal form and hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-35 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

Synthetic ZSM-35, when employed either as an adsorbent or as a catalyst in a hydrocarbon conversion process, should be dehydrated at least partially. This can be done by heating to a temperature in the range of 200° C to 600° C in an inert atmosphere, such as air, nitrogen, etc. and at atmospheric or subatmospheric pressures for between 1 and 48 hours. Dehydration can also be performed at lower temperature merely by placing the catalyst in a vacuum, but a longer time is required to obtain a sufficient amount of dehydration.

DESCRIPTION OF SPECIFIC EMBODIMENTS

Synthetic ZSM-35 prepared in accordance hereto can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange techniques would be to contact the synthetic ZSM-35 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 150° F to about 600° F and thereafter may be calcined in air or other inert gas at temperatures ranging from about 500° F to 1500° F for periods of time ranging from 1 to 48 hours or more to produce a catalytically-active thermal decomposition product thereof.

Regardless of the cation replacing the alkali metal in the synthesized form of the ZSM-35, the spatial arrangement of the aluminum, silicon and oxygen atoms which form the basic crystal lattices of ZSM-35 remains essentially unchanged by the described replacement of alkali metal as determined by taking an X-ray powder diffraction pattern of the ion-exchanged material.

The aluminosilicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-35 hereby prepared with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the ZSM-35, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, zeolite materials have been incorporated into naturally occurring clays, e.g. bentonite and kaolin. These materials, i.e clays, oxides, etc., function, in part, as binders for the catalyst. It is desirably to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized ASM-35 catalyst include the montmorillonite and kaolin family, which families include the sub-bentonites, and the kaolins commonly known as Dixie, McNamee, Georgia and Florida clays or others in which the main mineral constituents is halloysite, kaolinite, dickite, nacrite, or anauxite. Such clays can be used in the raw state as originally mined or initially subjected to calcination, acid treatment or chemical modification.

In addition to the foregoing materials, the ZSM-35 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-35 and inorganic oxide gel matrix vary widely with the crystalline aluminosilicate content ranging from about 1 to about 90 percent by weight and more usually in the range of about 2 to about 50 percent by weight of the composite.

In employing the ZSM-35 catalyst of this invention for polymerization of olefin containing liquid or gaseous charge stocks, such charge stocks can be polymerized at temperatures between 550 550° 850° F at an hourly space velocity of between 0.5 and 50 WHSV and a pressure between 0.1 and 800 psig.

In employing the catalyst of the present invention for aromatization of gaseous or liquid charge stocks which may be olefinic or paraffinic with or without aromatics present, such stocks can be aromatized at temperatures between 800 and 1200° F and pressures from 1 to 10 atmospheres and space velocities between 0.1 and 10 WHSV.

In order to more fully illustrate the nature of the invention and the manner of practicing same, the following examples are presented.

EXAMPLES 1-15

A series of comparative experiments were conducted to study facility of crystallization at 100° C. In each instance, a reaction mixture was prepared, placed in a polypropylene jar and then a steam chest for crystallization. The source of silicate was Q-Brand (27.8 wt. % $SiO_2$, 8.4 wt. % $Na_2O$ and 63.8 wt. % $H_2O$) and the source of aluminate was $Al_2(SO_4)_3 \cdot 16H_2O$ in each instance. In several of the experiments, conventional preparation technique was followed with the template being ethylenediamine or pyrrolidine. After a certain number of days in the steam chest, samples were taken and analyzed by X-ray diffraction to determine the type and purity of zeolite formed. Product compositions were also measured for a number of zeolites produced. Reaction and product data are presented in Table 2.

TABLE 2

Crystallization Experiments at 100° C

| | Example | $SiO_2/Al_2O_3$ | $H_2O/SiO_2$ | $OH/SiO_2$ | $Na/SiO_2$ | $R/SiO_2$ | $H^+$(add'l/$SiO_2$) | R* |
|---|---|---|---|---|---|---|---|---|
| Static | 1 | 30 | 39 | <0.01 | 0.59 | 0.34 | 0.43 | BDN |
| | 2 | 30 | 39 | <0.01 | 0.59 | 0.34 | 0.15 | BDN |
| | 3 | 30 | 39 | <0.01 | 0.59 | 0.14 | 0.02 | BDN |
| | 4 | 30 | 39 | <0.01 | 0.59 | 0.14 | 0.02 | BDN |
| | 5 | 30 | 40 | 0.29 | 0.59 | 0.15 | 0 | BDN |
| | 6 | 30 | 40 | 0.29 | 0.59 | 0.15 | 0 | BDN |
| | 7 | 33 | 33 | <0.01 | 0.53 | 0.42 | 0.16 | en |
| | 8 | 30 | 40 | <0.01 | 0.53 | 0.14 | 0.01 | en |
| | 9 | 30 | 39 | <0.01 | 0.59 | 0.68 | 0.43 | pn |
| | 10 | 30 | 39 | <0.01 | 0.59 | 0.68 | 0.15 | pn |
| | 11 | 30 | 39 | <0.01 | 0.59 | 0.27 | 0.02 | pn |
| | 12 | 30 | 40 | 0.29 | 0.59 | 0.30 | 0 | pn |
| | 13 | 30 | 40 | 0.29 | 0.59 | 0.19 | 0 | pn |
| Stirred | 14 | 30 | 39 | <0.01 | 0.59 | 0.14 | 0.02 | BDN |
| | 15 | 30 | 39 | <0.01 | 0.59 | 0.14 | 0.02 | en |

Product Composition**

| | Example | Days | Zeolite | $SiO_2/Al_2O_3$ | Al/uc | Na/uc | N/uc | C/N |
|---|---|---|---|---|---|---|---|---|
| Static | 1 | 210 | 85% ZSM-35 | 25.9 | 2.6 | 0.3 | 6.5 | 2.7 |
| | 2 | 37 | 100% ZSM-35 | 30.0 | 2.3 | 0.1 | 6.7 | 2.2 |
| | 3 | 32 | 100% ZSM-35 | 30.3 | 2.2 | 0.2 | 7.1 | 2.4 |
| | 4 | 39 | 100% ZSM-35 | — | — | — | — | — |
| | 5 | 50 | 100% ZSM-35 | 20.1 | 3.3 | <0.1 | 6.4 | 2.5 |
| | 6 | 70 | 80% ZSM-35 | — | — | — | — | — |
| | 7 | 180 | amorphous | — | — | — | — | — |
| | 8 | 220 | 30% ZSM-5 | — | — | — | — | — |
| | 9 | 100 | amorphous | — | — | — | — | — |
| | 10 | 35 | 100% ZSM-35 | 29.1 | 2.3 | 0.1 | 4.1 | 4.5 |
| | 11 | 39 | 100% ZSM-35 | 26.6 | 2.5 | 0.2 | 3.9 | 4.5 |
| | 12 | 85 | 50% ZSM-35 + 50% Mordenite | — | — | — | — | — |
| | 13 | 70 | 10% ZSM-35 | — | — | — | — | — |
| Stirred | 14 | 17 | 100% ZSM-35 | 26.3 | 2.5 | 0.7 | 7.5 | 4.2 |
| | 15 | 31 | 75% ZSM-5 | — | — | — | — | — |

*BDN = 1,4-butanediamine;
en = ethylenediamine;
pn = pyrrolidine.
**uc = unit cell, assumed to contain 36 Si and Al tetrahedra.

EXAMPLES 16–28

A series of comparative experiments were conducted to study facility of crystallization at 160° C. In each instance, a reaction mixture was prepared, placed in a teflon jar and then a steam chest for crystallization. The source of silicate was Q-Brand (27.8 wt. % $SiO_2$, 8.4 wt. % $Na_2O$ and 63.8 wt. % $H_2O$) and the source of aluminate was $Al_2(SO_4)_3 \cdot 16H_2O$ in each instance. In several of the experiments, conventional preparation technique was followed with the template being ethylenediamine or pyrrolidine. After a certain number of days in the steam chest, samples were taken and analyzed by X-ray diffraction to determine the type and purity of zeolite formed. Product compositions were also measured for a number of zeolites produced. Reaction and product data are presented in Table 3.

TABLE 3

Crystallization Experiments at 160° C

| Example | $SiO_2/Al_2O_3$ | $H_2O/SiO_2$ | $OH/SiO_2$ | $Na/SiO_2$ | $R/SiO_2$ | $H^+$(add'l)/$SiO_2$ | R* |
|---|---|---|---|---|---|---|---|
| 16 | 30 | 40 | <0.01 | 0.59 | 0.68 | 0.35 | BDN |
| 17 | 30 | 39 | <0.01 | 0.59 | 0.33 | 0.14 | BDN |
| 18 | 30 | 39 | <0.01 | 0.59 | 0.34 | 0.08 | BDN |
| 19 | 30 | 39 | <0.01 | 0.59 | 0.14 | 0.03 | BDN |
| 20 | 30 | 33 | 0.26 | 0.59 | 0.33 | 0 | BDN |
| 21 | 30 | 39 | 0.27 | 0.59 | 0.34 | 0 | BDN |
| 22 | 30 | 39 | 0.54 | 0.90 | 0.34 | 0 | BDN |
| 23 | 15 | 39 | 0.01 | 0.59 | 0.34 | 0 | BDN |
| 24 | 30 | 39 | <0.01 | 0.59 | 0.33 | 0.14 | en |
| 25 | 30 | 39 | <0.01 | 0.59 | 0.14 | 0.03 | en |
| 26 | 30 | 33 | 0.26 | 0.59 | 0.33 | 0 | en |
| 27 | 30 | 40 | 0.27 | 0.59 | 0.33 | 0 | pn |
| 28 | 30 | 40 | 0.54 | 0.59 | 0.68 | 0 | pn |

Product Composition

| Example | Days (Static) | Zeolite | $SiO_2/Al_2O_3$ | Al/uc | Na/uc | N/uc | C/N |
|---|---|---|---|---|---|---|---|
| 16 | 4 | amorphous | — | — | — | — | — |
| 17 | 3 | 98% ZSM-35 | 29.7 | 2.3 | 0.1 | 3.5 | 4.1 |
| 18 | 4 | amorphous | — | — | — | — | — |
| 19 | 3 | 95% ZSM-35 | 26.4 | 2.5 | 0.5 | 2.6 | 4.1 |
| 20 | 3 | 100% ZSM-35 | 16.1 | 4.0 | 1.3 | 3.1 | 4.4 |
| 21 | 5 | 20% ZSM-35 + 25% Mordenite[a] | — | — | — | — | — |
| 22 | 5 | 45% ZSM-35 + 45% Mordenite | — | — | — | — | — |
| 23 | 7 | 95% ZSM-35 + 5% analcite | 13.8 | 4.6 | 1.9 | 3.0 | 5.1 |
| 24 | 7 | amorphous | — | — | — | — | — |

TABLE 3-continued

| | | Crystallization Experiments at 160° C | | | | | |
|---|---|---|---|---|---|---|---|
| 25 | 7 | 50% ZSM-5 + 30% Mordenite[b] | — | — | — | — | — |
| 26 | 7 | 80% Mordenite[a] | — | — | — | — | — |
| 27 | 4 | 40% ZSM-35 + 60% Mordenite | — | — | — | — | — |
| 28 | 4 | 80% ZSM-35[c] | — | — | — | — | — |

*BDN = 1,4-butanediamine;
en = ethylenediamine;
pn = pyrrolidine.
[a] plus dense phase, possibly α-quartz - analcite mixture
[b] plus α-cristobalite
[c] plus other zeolites such as ZSM-5.

EXAMPLE 29

This example demonstrates that improved ZSM-35 catalysts are obtained by the present improved process when compared to those obtained by conventional technique described in U.S. Pat. No. 4,016,245. Two samples of ZSM-35 were prepared according to the conventional technique, one with pyrrolidine and the other with ethylenediamine as template. The catalytic activity of each was tested and compared with the zeolite product of Example 19 (present improved method). Activity was measured with a feedstock comprising equal weights of n-hexane ($nC_6$); 3-methylpentane (3mp); 2,3-dimethylbutane (2,3-dmb); benzene and toluene. Reaction conditions were 200 psig, hydrogen/hydrocarbon mole ratio of 4 and a weight hourly space velocity of about 4 $hr^{-1}$. In this test, catalysts exhibit both their activity and their shape selectivity for paraffin conversion. In addition to possible disproportionation of toluene, the catalysts may also effect a net alkylation of aromatics by the olefinic fragments of cracking, thereby increasing gasoline yield. Reaction temperature and results are presented in Table 4. It is readily observed that the improved ZSM-35 (Example 19) prepared in accordance hereto was much more active, more selective and produced more gasoline-range yield (by aromatics alkylation) than the ZSM-35 samples prepared by conventional technique.

TABLE 4

Catalytic Conversion Test

| ZSM-35 Catalyst | Temp. ° C | Conversion, Percent | | | Alkylation Efficiency, Percent |
|---|---|---|---|---|---|
| | | nC6 | 3 mp | 2,3 dmb | |
| Example 19 | 370 | 93 | 1 | 0 | 6 |
| Conventional Preparation With Ethylenediamine | 370 | 79 | 2 | 2 | 1 |
| Example 19 | 427 | 96+ | 20 | 13 | 10 |
| Conventional Preparation With Pyrrolidine | 427 | 68 | 8 | 7 | 2 |

What is claimed is:

1. A synthetic crystalline aluminosilicate zeolite having a composition in the anhydrous state, expressed in terms of mole ratios of oxides as follows:

$$(0.3-5)R : (0-0.8)M_2O : Al_2O_3 : xSiO_2$$

wherein R is butanediamine or an organic nitrogen-containing cation derived therefrom, M is an alkali metal cation and x is greater than 8, and having an X-ray powder diffraction pattern substantially as that shown in Table 1 of the specification.

2. A synthetic crystalline aluminosilicate zeolite according to claim 1 having a composition in the anhydrous state, expressed in terms of mole ratios of oxides as follows:

$$(0.4-2.5)R : (0-0.6)M_2O : Al_2O_3 : ySiO_2$$

wherein y is from greater than 8 to about 50.

3. A synthetic crystalline aluminosilicate zeolite according to claim 1 wherein M is sodium.

4. A synthetic crystalline aluminosilicate zeolite according to claim 2 wherein M is sodium.

5. A synthetic crystalline aluminosilicate zeolite comprising the zeolite of claim 1 having its original alkali metal cations replaced, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

6. A synthetic crystalline aluminosilicate zeolite comprising the zeolite of claim 2 having its original alkali metal cations replaced, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

7. A synthetic crystalline aluminosilicate zeolite comprising the zeolite of claim 3 having its original sodium cations replaced, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

8. A synthetic crystalline aluminosilicate zeolite comprising the zeolite of claim 4 having its original sodium cations replaced, at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

9. The synthetic crystalline aluminosilicate zeolite of claim 5 wherein said replacing cation is hydrogen or a hydrogen precursor.

10. The synthetic crystalline aluminosilicate zeolite of claim 6 wherein said replacing cation is hydrogen or a hydrogen precursor.

11. The synthetic crystalline aluminosilicate zeolite of claim 7 wherein said replacing cation is hydrogen or a hydrogen precursor.

12. The synthetic crystalline aluminosilicate zeolite of claim 8 wherein said replacing cation is hydrogen or a hydrogen precursor.

13. The method for preparing the crystalline aluminosilicate zeolite defined in claim 1 which comprises preparing a mixture containing sources of an alkali metal oxide, an organic nitrogen-containing oxide, an oxide of aluminum, an oxide of silicon and water and having a composition, in terms of mole ratios of oxides, falling within the following ranges:

| | | |
|---|---|---|
| $SiO_2/Al_2O_3$ | = | 8.8–200 |
| $H_2O/SiO_2$ | = | 5–100 |
| $OH^-/SiO_2$ | = | $10^{-10}$–1.0 |
| $M/SiO_2$ | = | 0.1–3.0 |
| $R/SiO_2$ | = | 0.05–2.0 | wherein R is butanediamine or an organic nitrogen-containing cation derived therefrom and M is an alkali metal ion, and maintaining the mixture at a temperature of at least 90° F until the crystals of said aluminosilicate are formed.

14. The method according to claim 13 wherein the temperature is maintained between about 90° F and about 400° F.

15. The method according to claim 14 wherein the temperature is maintained between about 150° F and about 400° F.

16. A synthetic crystalline aluminosilicate zeolite according to claim 1 wherein said butanediamine is 1,4-butanediamine.

17. A synthetic crystalline aluminosilicate zeolite according to claim 5 wherein said butanediamine is 1,4-butanediamine.

18. A synthetic crystalline aluminosilicate zeolite according to claim 9 wherein said butanediamine is 1,4-butanediamine.

19. The method according to claim 13 wherein said butanediamine is 1,4-butanediamine.

* * * * *